Figures 1A, 1B, 1C, 2:
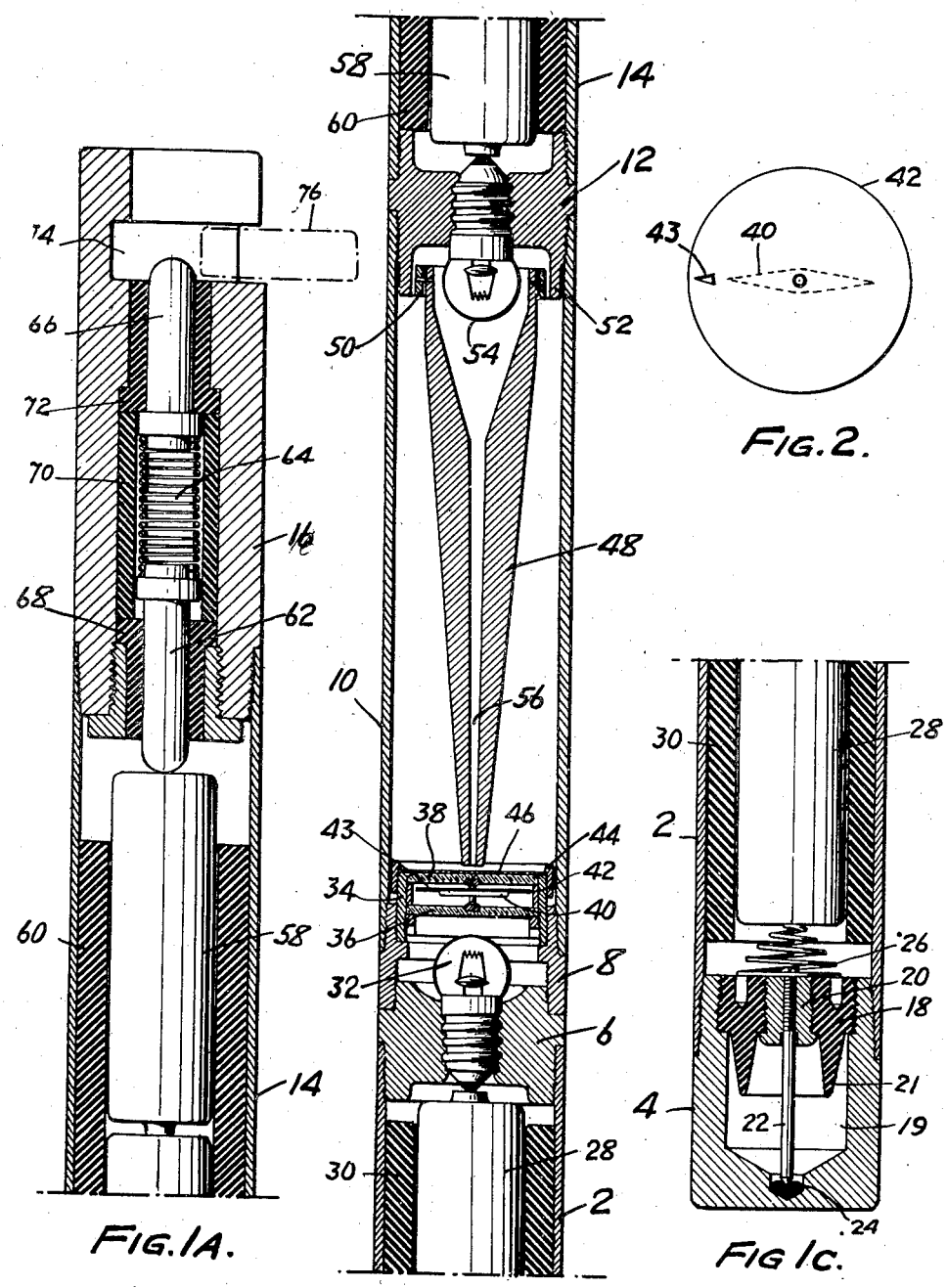

Jan. 21, 1947.  G. A. SMITH  2,414,702
WELL SURVEYING DEVICE
Filed June 21, 1941

WITNESS:
INVENTOR
George A. Smith
BY
Busser + Harding
ATTORNEYS.

Patented Jan. 21, 1947

2,414,702

UNITED STATES PATENT OFFICE 2,414,702

WELL SURVEYING DEVICE

George A. Smith, Philadelphia, Pa., assignor to Sperry-Sun Well Surveying Company, Philadelphia, Pa., a corporation of Delaware Application June 21, 1941, Serial No. 399,085

2 Claims. (Cl. 33—205.5)

This invention relates to a well surveying instrument and has particular reference to a well surveying instrument of the so-called single shot type though, as will be clear hereafter, it is possible in utilizing the instrument of the present invention to produce a limited plurality of records.

Practical directional well surveying instruments adapted to produce records of both inclination and direction of inclination have heretofore been of photographic type and have involved the use of timing means to effect the exposure of a photographic film at a predetermined time for a short interval to produce the instrument record. There has recently been developed an inclinometer illustrated in the application of Roland Ring, Serial No. 313,706, filed January 13, 1940, Patent No. 2,240,417, dated April 29, 1941, which inclinometer does not depend for its operation upon the use of any timing device, but operates by producing a record slowly so that a record which is distinguishable as a valid one will be produced only when the instrument is at rest for a substantial period of time. While the recording means of the instrument is active throughout the entire time of descent and ascent, the movement of the recording means prevents the formation of any definite record during the descent and ascent. This instrument is adapted to produce a plurality of records of inclination by holding it stationary at different positions for varying periods of time, whereupon there are produced a plurality of records distinguished by their intensity or size and which may be correlated at the positions at which they were made by taking into account the varying periods of inactivity. Such operation of the instrument is described in the application of Roland Ring, Serial No. 379,835, filed February 20, 1941.

It is the object of the present invention to provide a directional instrument having similar characteristics of operation to produce one or more records of both inclination and direction without the presence of timing means. The instrument is not only adapted for determining the course of a bore hole but, as will be evident, for orientation purposes in accordance with the principles of the patent to Hyer, No. 2,120,670, issued June 14, 1938.

This general object, and other objects particularly relating to details, will become apparent from the following description, read in conjunction with the accompanying drawing, in which:

Figures 1A, 1B and 1C illustrate longitudinal cross-sections, respectively, of the upper, intermediate and lower parts of an instrument forming a preferred embodiment of the invention; and Figure 2 is a plan view of a compass member in the instrument.

The instrument illustrated in Figures 1A, 1B and 1C is the instrument proper, which, when lowered into a bore hole, is contained within a protective casing which, in the present instance, must be of non-magnetic material in order that the compass may function to give directional indications. The remainder of the instrument, or at least those portions thereof in the vicinity of the compass are also non-magnetic so that the compass may freely seek its position in the magnetic field of the earth or in an artificially provided magnetic field in case the instrument is used for orientation purposes.

The instrument comprises a tube 2 closed at its lower end by a plug 4 and connected at its upper end through a coupling 6 with a supporting sleeve 8 which, in turn, is connected to an intermediate tube 10. This tube is surmounted by a coupling member 12 to which is secured an upper tube 14 capped by an end piece 16.

The lower plug 4 has threaded into a bore 19 provided in it an insulated piece 18 in which is threaded a metallic member 20 carrying a conductive pin 22. When the instrument is in upright position as illustrated, the pin 22 engages a globule of mercury 24 located in a reduced cup portion of the bore 19 of the metallic plug. A spring 26 supported by the member 20 is engaged by the casing of the lowermost of a series of batteries 28 which may be insulated from the tube 2 by an insulating sleeve 30. One or more batteries may be provided as required by the lamp 32, which they are adapted to energize, this lamp being threaded into the plug 6 and having its central contact engaging the center positive pole of the uppermost battery if a plurality of batteries is used. It will be evident that when the apparatus is upright, the circuit is completed through the lamp 32 by reason of the presence of the globule 24 in contact with the pin 22. When the instrument is tilted substantially from the vertical or is inverted, the globule will no longer make contact with the pin 42, and accordingly the lamp circuit will be open. When set aside prior to or after use, it is contemplated that the instrument shall be placed in an inverted position.

Threaded into the coupling 8 is a compass assembly indicated at 34 and consisting of an annular member in which is assembled through the use of a clamping ring and spacers upper and lower glass members 36 and 38 providing between them a compass chamber and carrying bearings for the spindle of a compass assembly indicated in Figure 2. This assembly comprises a compass needle 40 provided with a spindle in the usual fashion and carrying an opaque disc 42 provided with an opening 43, for example of triangular shape, as illustrated in Figure 2. The glass covered disc is desirably rendered opaque by a lacquer or the like around its periphery so that its upper portion overlaps slightly the edges of the disc 42, with the result that illumination from below can pass through the glass plate 38 only by way of the opening 43.

A ring 44 is adapted to be threaded to the exterior of the compass assembly 34 and is provided with an inwardly directed flange to clamp thereon a photographic film, indicated at 46, desirably in the form of a disc of Celluloid carrying an emulsion which may be of a type hereafter discussed.

Above the photographic disc 46 is located a pendulum 48 centrally suspended through a gimbal mounting, indicated at 52, on the coupling member 12. This pendulum 48 is provided with a central bore 56 through which light may pass from a lamp 54 located in an enlarged opening in the upper portion of the pendulum concentric with the center of its mounting. A plain bore 56 may be provided, or, alternatively, this may be elaborated to an optical system by means of a series of lenses so as to project a well defined spot of light on the film 46, adjacent to which the lower end of the pendulum closely moves.

The bulb 54 is threaded into the coupling 12 and has its central contact in engagement with the central pole of the lowermost of one or more batteries 58, insulated from the tube 14 by means of an insulating sleeve 60. The uppermost battery engages a pin 62 pressed downwardly by a spring 64, which also urges upwardly an upper pin 66, these pins and spring being located in an insulating assembly, the arrangement of which will be evident from consideration of the part 68, 70 and 72. The pin 66 propects into a laterally opening slot 74 and the circuit through the lamp 54 will close in obvious fashion by the insertion of a metal disc 76 into the slot. Instead of the disc 76, in normal operation a cap of the protective casing is provided with a metal disc carried by a central metal pin, so that as assembly of the instrument is made into the protective casing, the circuit will be closed, the instrument being supported by the cap of the casing.

The photographic film may be of several types. It desirably consists of a sheet of transparent Celluloid, so that marking may be effected by illumination both from above and below it. The emulsion used depends entirely on the operation which is desired. If development of the disc is desirable, the emulsion may be of developing-out type, in which case the film will generally be relatively fast and, for the purposes of operation described hereafter, the illumination intensity on the film may be relatively low. Lamps of quite small wattage may be used in such case with sufficient batteries energizing them. If in such case the intensity is still too high, there may be interposed in the optical paths dimming devices in the form, for example, of filter glasses.

On the other hand, and leading to still greater simplicity of operation, there may be used an emulsion of printing-out type. In such case, depending upon the light sensitivity of the printing-out emulsion, the illumination may be relatively intense, and relatively high wattage lamps may be used, each energized by a plurality of batteries. Generally speaking, the emulsions may be of suitable types, which are commercially available and have widely varying sensitivities. If a printing-out emulsion is used, the record may be taken out of the instrument and examined directly without development in daylight. If it is not kept in strong illumination for too long a period, it may then be placed in a light-tight container and will keep indefinitely, or it may be immediately fixed to preserve the printed-out record. On the other hand, if a developing-out emulsion is used, which is of any moderate speed, it will be necessary to handle the film in a completely or fairly dark region, in order that the record made will not be obliterated by over-all exposure of the disc to light.

In either case, the same general type of operation occurs. The instrument is prepared for use by locating it in its protective casing and turning it to a vertical position, whereupon it may be run into a bore hole, on a wire line or in go-devil fashion. So long as it is in motion, with the proper choice of light intensity and film sensitivity, no substantial records will be made, since the pendulum will be in oscillation and the compass will be swinging about its pivot. However, when the instrument is brought to rest, the pendulum will assume a vertical position, while the compass will line up with the local magnetic field and occupy a fixed position. If the instrument is then retained at rest for a period of, say, one minute, or of some other length of time, depending upon the illumination and sensitivity, a record will be produced consisting of a circular spot due to the pendulum and a triangular spot on the edge of the film due to the opening 43 through which rays pass from the concentrated filament of the bulb 32. This image, of course, will be latent in the case of a developing-out filament, or will appear by darkening in the case of a printing-out film. If a single record is to be made, following this suitable location of the instrument in a position of rest, it may be withdrawn from the hole and the film removed and examined or developed and examined, depending upon its nature.

Multiple records may be made by permitting the instrument to remain in various positions for different periods of time. For example, assume that it remains in three different positions for periods of one minute, two minutes, and three minutes respectively. In such case, there will generally appear three circular markings and three triangular markings. In each case the markings will be of different intensity, so that the respective positions in which they were made may be easily determined. In this way, a limited plurality of records, say, up to five or six, may be readily made and distinguished. The motion during the lowering operation, between the record making rest periods, and during withdrawal will prevent obliteration.

If the instrument is to be used in go-devil fashion to produce a directional record, a drill stem may be provided with a non-magnetic sub adjacent its lower end into which the instrument may be dropped and wherein it will be arrested. In such case, the withdrawal of the instrument may be desirable with the drill stem, and since in a deep hole the withdrawal of the drill stem is a matter of a substantial period of time, it may happen that the workmen may desire to rest, or there may arise some necessity for interrupting the withdrawal. In such case, it may be desirable to include in the circuits of the two lamps time limiting devices of the type illustrated in my application Serial No. 385,424, filed March 27, 1941.

Two separate lamp circuits and corresponding sets of batteries have been illustrated and are desirable to avoid the complication of passing a current lead past the location of the record disc and the compass. The complication of doing this is further increased by the necessity for shielding so that the compass will not be affected by the passage of relatively heavy lamp current. However, even shielding is undesirable, because it must necessarily be of magnetic type unless a twisted pair of wires is used. While a single set of batteries may be used in accordance with the invention, it is simpler and more desirable to provide separate sets as illustrated.

While in general the motion during lowering or raising will tend to vibrate the compass and cause it to swing sufficiently to prevent the formation of a record during said movements, insurance that the compass would not be pointing more or less continuously in the same direction may be secured by providing the nose of the protective casing with rubber shock absorbers provided with spirally arranged grooves so as to cause the protective casing to rotate back and forth during the lowering and raising operations.

While the instrument is desirably of the nature described, to avoid the presence of clock control, it will be evident that some of its features are equally applicable to a clock controlled instrument as, for example, the arrangement of an opaque compass disc with an opening in it through which the rays from a lamp may be passed to the sensitised film. As to detailed features of construction, therefore, the invention is not to be considered as limited to an instrument from which clock control is absent.

What I claim and desire to protect by Letters Patent is:

1. A well surveying instrument comprising a casing adapted to enter a bore hole, means for supporting a record member within the casing, a pendulum located on one side of said record member, a magnetic compass located on the opposite side of said record member, a pair of electrically energized means for producing simultaneously on said record member records of the positions of said pendulum and said compass respectively, and separate power supplies for the respective means for the recording of the pendulum and compass positions located on opposite sides of said record member and compass so that current-carrying leads do not extend past the level of said magnetic compass.

2. A well surveying instrument comprising a casing adapted to enter a bore hole, a compass chamber having light transmitting upper and lower ends located within said casing, a magnetic compass located within said chamber, means for supporting a light sensitive record member upon said compass chamber, a pendulum located above said record member, and means for producing simultaneously on said record member records of the positions of said pendulum and said compass, the last named means comprising means for projecting a restricted beam of light in the direction of the axis of said pendulum upon the record member, and means for projecting a beam of light through an opening in the peripheral portion of the compass upon said record member.

GEORGE A. SMITH.